United States Patent
Gheorghe et al.

(10) Patent No.: US 8,538,189 B2
(45) Date of Patent: Sep. 17, 2013

(54) IMAGE NOISE FILTER AND METHOD

(75) Inventors: Radu Gheorghe, Richardson, TX (US);
Milivoje Aleksic, San Diego, CA (US);
Sergio Goma, San Diego, CA (US)

(73) Assignee: ATI Technologies ULC, Markham, Ontario (CA)

( * ) Notice: Subject to any disclaimer, the term of this patent is extended or adjusted under 35 U.S.C. 154(b) by 763 days.

(21) Appl. No.: 12/617,922

(22) Filed: Nov. 13, 2009

(65) Prior Publication Data

US 2010/0225789 A1    Sep. 9, 2010

Related U.S. Application Data

(60) Provisional application No. 61/114,813, filed on Nov. 14, 2008.

(51) Int. Cl.

| G06K 9/40 | (2006.01) |
| G06K 9/48 | (2006.01) |
| G06K 9/46 | (2006.01) |
| H04N 7/12 | (2006.01) |
| H04N 1/407 | (2006.01) |

(52) U.S. Cl.
USPC ...... 382/260; 382/199; 382/240; 375/240.19; 358/3.27

(58) Field of Classification Search
USPC .......... 382/167, 240, 254, 260–264, 266, 382/274–275, 305, 312; 375/240.19, 254; 348/207.99, 223.1, 241; 358/3.15, 3.27
See application file for complete search history.

(56) References Cited

U.S. PATENT DOCUMENTS

| 6,741,739 | B1 * | 5/2004 | Vincent ......................... 382/191 |
| 7,106,910 | B2 * | 9/2006 | Acharya et al. ............... 382/240 |
| 7,151,858 | B2 * | 12/2006 | Kyong ......................... 382/266 |
| 7,206,459 | B2 * | 4/2007 | Berkner et al. ............... 382/251 |
| 7,418,142 | B2 * | 8/2008 | Zandi et al. ................... 382/232 |
| 7,430,336 | B2 * | 9/2008 | Raveendran .................. 382/268 |
| 7,548,656 | B2 * | 6/2009 | Nakajima et al. ............. 382/240 |
| 7,705,885 | B2 * | 4/2010 | Prieto et al. .............. 348/208.99 |
| 7,725,146 | B2 * | 5/2010 | Li et al. ......................... 600/336 |
| 7,907,785 | B2 * | 3/2011 | Fukuhara et al. ............. 382/240 |
| 7,957,599 | B2 * | 6/2011 | Berkner et al. ............... 382/232 |
| 8,244,034 | B2 * | 8/2012 | Ishiga ........................... 382/167 |

* cited by examiner

Primary Examiner — Kanjibhai Patel
(74) Attorney, Agent, or Firm — Faegre Baker Daniels LLP

(57) ABSTRACT

An image noise filter includes a wavelet transform module and an edge based adaptive filter module. The dual tree wavelet transform module provides low frequency wavelet information and high frequency wavelet information in response to image information. The edge based adaptive filter module provides filtered high frequency wavelet information in response to the high frequency wavelet information and edge information that is based on the low frequency wavelet information.

20 Claims, 4 Drawing Sheets

IMAGE NOISE FILTER AND METHOD

CROSS-REFERENCE TO RELATED APPLICATIONS

The present patent application claims priority from and the benefit of U.S. Provisional Patent Application No. 61/114,813, filed Nov. 14, 2008, having inventors Radu Gheorghe, et al., entitled IMAGE NOISE FILTER AND METHOD, owned by instant Assignee and which is incorporated herein by reference in its entirety.

FIELD

The present disclosure generally relates to image processing, and more particularly, to filtering noise from processed images.

BACKGROUND

Color imaging processing pipelines typically include a sensor with a color filter array (CFA). During processing, color correction, white balancing, and other processing steps can cause the sensor to have an unequal sensitivity on different channels, which requires analog, and in some cases digital, gains of the sensor to be adjusted. In addition, color interpolation (e.g., when sensor channels are correlated), can give rise to what it is referred to as chrominance noise. Chrominance noise appears as low frequency colored blotches throughout an image, especially in darker flat areas. The effect is more pronounced in lower light levels where the characteristic features are observed as irregularly shaped clusters of colored pixels that can vary anywhere from 15 to 25 pixels across for example.

Although a spatially adaptive color correction matrix can reduce chrominance noise, post processing an image remains problematic. Various image de-noising methods have been developed ranging from bilateral filtering, anisotropic diffusion, and more wavelet coefficient thresholding or shrinkage and de-noising in fractal frameworks. However, each of these methods have undesirable drawbacks.

BRIEF DESCRIPTION OF THE DRAWINGS

The disclosure will be more readily understood in view of the following description when accompanied by the below figures, wherein like reference numerals represent like elements.

DETAILED DESCRIPTION

In one example, an image noise filter includes a wavelet transform module and an edge based adaptive filter module. The wavelet transform module provides low frequency wavelet information and high frequency wavelet information in response to image information. The edge based adaptive filter module provides filtered high frequency wavelet information in response to the high frequency wavelet information and edge information that is based on the low frequency wavelet information. A related method is also disclosed.

The filter and method, among other advantages, reduce chrominance noise associated with the image information. In addition, the filter and method effectively reduce ringing artifacts (i.e., the Gibbs phenomenon) that are typically encountered when using wavelet image de-noising. Furthermore, the filter and method effectively reduce (or in some cases eliminate) checkerboard reconstruction artifacts that are commonly present in prior art wavelet transform methods. Other advantages will be recognized by those of ordinary skill in the art.

As used herein, the term "circuit" and/or "module" can include an electronic circuit, one or more processors (e.g., shared, dedicated, or group of processors such as but not limited to microprocessors, DSPs, or central processing units) and memory, that execute one or more software or firmware programs, combinational logic circuits, an ASIC, and/or other suitable components that provide the described functionality. A "circuit" or "module" can be "powered down" by reducing power to a desired reduced power level including to a level rendering it inoperative. Additionally, as will be appreciated by those of ordinary skill in the art, the operation, design, and organization, of a "circuit" or "module" can be described in a hardware description language such as Verilog™, VHDL, or other suitable hardware description languages.

Figure 1:
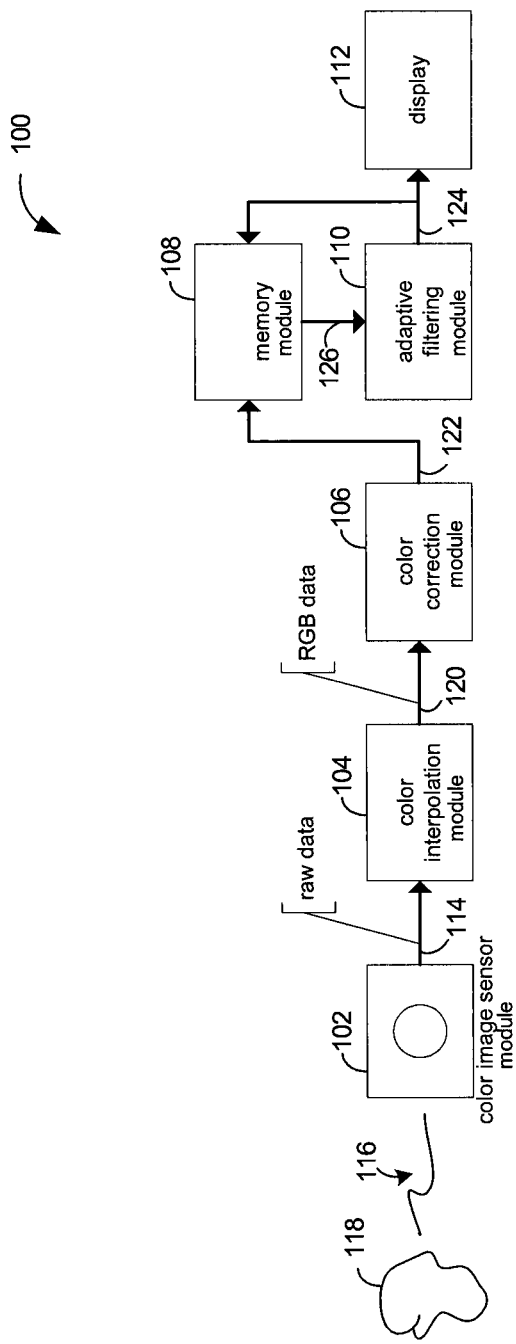
FIG. 1 is an exemplary functional block diagram of the device having an adaptive filtering module according to the present disclosure.

Referring now to FIG. 1, a device 100 such as a digital camera, cellular telephone having a camera, or other suitable device is depicted. The device 100 includes a color image sensor module 102, a color interpolation module 104, a color correction module 106, a memory module 108, an adaptive filtering module 110, and in some embodiments a display 112.

The color image sensor module 102 provides raw image information 114 based on light 116 reflected from an object 118. The color interpolation module 104 provides color interpolated image information 120 (e.g., RGB image information) in response to the raw image information 114. The color correction module 106 provides color corrected image information 122 in response to the color interpolated image information 120. The memory module 108 stores the color corrected image information 122.

The adaptive filtering module 110 provides filtered image information 124 in response to image information 126 (e.g. the stored color corrected image information 122) retrieved from the memory module 108. More specifically, as will be discussed in more detail, the adaptive filtering module 110 provides the filtered image information 124 based on adaptive wavelet shrinkage that is based on edge information from low frequencies sub-bands of the image information 126. The memory module 108 can store the filtered image information 124. In addition, the display 112 can display an image based on the filtered image information 124.

The adaptive filtering module 110 can achieve the same or similar effect as that of a very large kernel by decompressing the image using a dual tree wavelet transform where the low-frequency bands are spatially filtered in the wavelet domain with a much smaller kernel. In addition, rather than convolving the chrominance channels with a kernel, the adaptive filtering module 110 averages in a modified hue saturation chromaticity space.

Furthermore, a bilateral filter technique and method of threshold estimation based on a polyhedron classifier in three dimensions is disclosed similar to the technique and method disclosed in R. Gheorghe, M. Aleksic and M. Smirnov, "Novel method of Euclidean distance calculation for bilateral filtering based on CMOS sensor noise profiles", in *Proceedings of the SPIE Electronic Imaging Conference*, Vol. 6817, San Jose, Calif., 2008, which is hereby incorporated by reference in its entirety. This disclosure improves on the bilateral filter technique and method in order to infer edge locations in an image. By using the edge information from each low frequency sub-band and an estimate of local variance within a pixel neighborhood in the high frequency sub-bands, an adaptive threshold mechanism can be used to filter wavelet coefficients in the high frequency chrominance and luminance sub-bands.

The adaptability of the threshold around edges effectively reduces (and in some cases eliminates) the Gibbs phenomenon commonly encountered in wavelet image de-noising. Furthermore, the nature of the dual tree wavelet transform, in terms of its directionality and near shift invariance also reduces (and in some cases eliminates) checkerboard reconstruction artifacts that are typically present in prior art wavelet transform methods.

Figure 2:
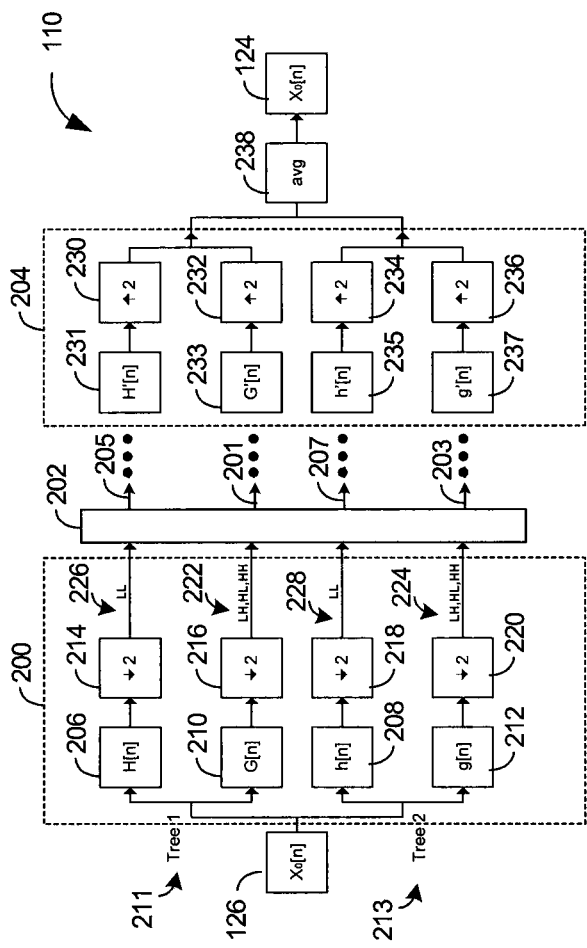
FIG. 2 is an exemplary functional block diagram of the adaptive filtering module having a dual tree stage wavelet analysis and synthesis module.

Referring now to FIG. 2, the adaptive filtering module 110 includes a wavelet transform module 200, a low-frequency edge based adaptive filtering module 202, and an inverse wavelet transform module 204. In one example, the wavelet transform module 200 can include a first and second branch 211, 213 as shown in order to perform dual tree wavelet analysis.

The image information 126 is passed through two low pass filters 206, 208 depicted by $H_{[n]}$ and $h_{[n]}$, respectively. Similarly, the image information 126 is passed through two high pass filters 210, 212 depicted by $G_{[n]}$ and $g_{[n]}$, respectively. Subsequent sub-sampling by downsampling modules 214, 216, 218, 220 yield high frequency sub-bands (e.g., LH, HL, HH) generally identified at 222, 224 and low frequency sub-bands (e.g., LL) generally identified at 226, 228.

The low-frequency edge based adaptive filter module 202 filters the high frequency sub-bands (e.g., LH, HL, HH) and the low-frequency sub-bands (e.g., LL) in order to provide respective filtered high frequency sub-bands 201, 203 and respective filtered low-frequency sub-bands 205, 207.

The inverse wavelet transform module 204 performs the inverse analysis (e.g., inverse wavelet transform) of the wavelet transform module 200 by utilizing inverse high frequency filters 231, 235, inverse low frequency filters 233, 237, and up sampling modules 230, 232, 234, 236. The output of the inverse wavelet transform module 204 is then averaged among the two tree outputs by averaging module 238 to yield the filtered image information 124 (e.g., final synthesized data).

Figure 3:
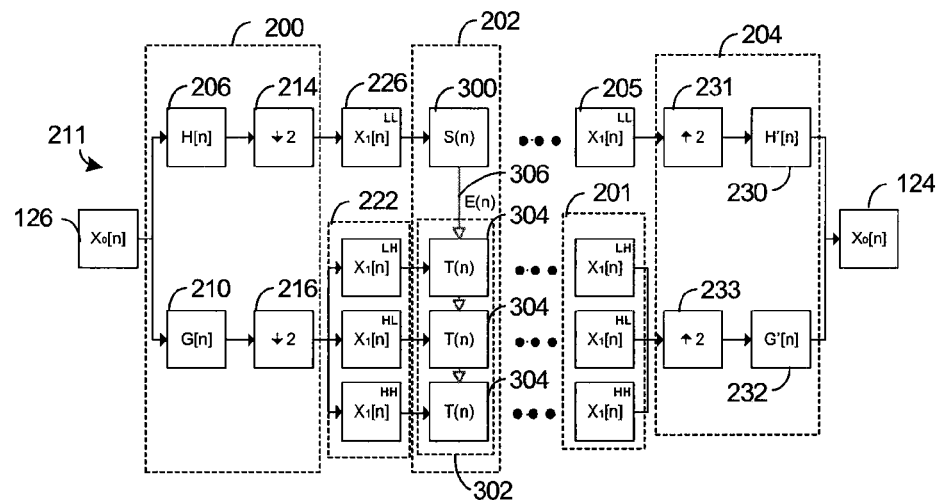
FIG. 3 is an exemplary functional block diagram of one branch of the dual tree stage wavelet analysis and synthesis module.

Referring now to FIG. 3, an example of a single tree of the adaptive filtering module 110 is depicted. Here, S(n), T(n) and E(n) represent the spatial filtering, wavelet coefficient thresholding and edge information exchange, respectively, and will be discussed in more detail below. The low-frequency edge based adaptive filtering module 202 includes a low-frequency spatial filter and edge detection module 300 and an edge based adaptive filter module 302 (e.g., an adaptive wavelet shrinkage threshold module), which includes individual adaptive wavelet shrinkage threshold modules 304 for each respective high frequency sub-band 222 (e.g., LH, HL, HH).

With regard to the low-frequency spatial filter and edge detection module 300, a hue-saturation 2D chromaticity diagram is used to identify chromatic noise. As such, Matrix A can be used to transform an RGB value into the hue-saturation 2D chromaticity diagram space and $A^{-1}$ can be used to transform back to RGB from the hue-saturation 2D chromaticity diagram space:

$$A = \begin{bmatrix} 1 & 0 & 1/3 \\ -0.5 & 0.866 & 1/3 \\ -0.5 & -0.866 & 1/3 \end{bmatrix}$$

Figure 5:
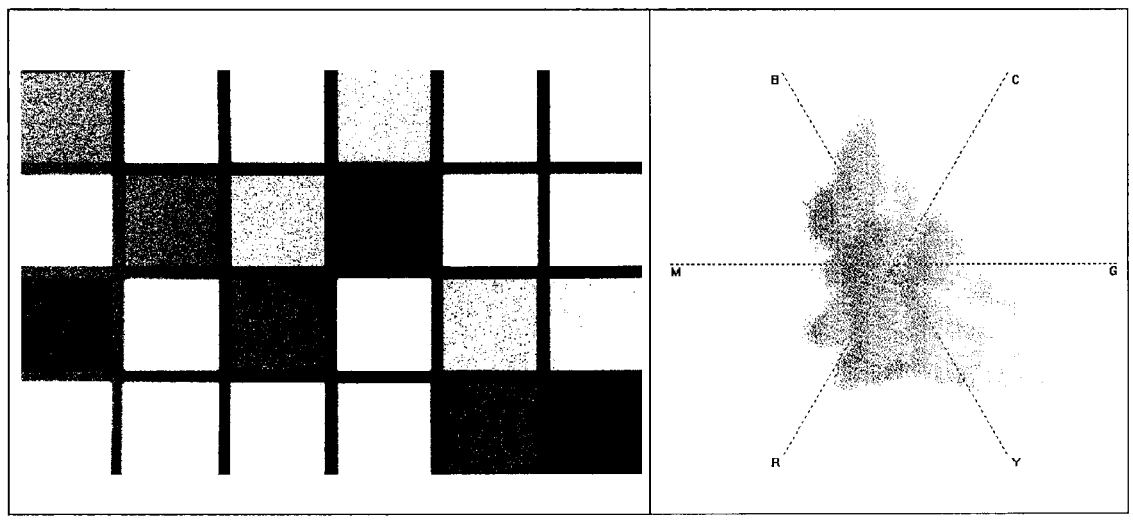
FIG. 5 depicts chrominance noise on a Macbeth Color Checker chart and corresponding 2D chromaticity diagram.

According to the illustration in FIG. 5, the hue-saturation 2D chromaticity diagram space is referred to as the xyV space, where x and y represent hue-saturation Cartesian coordinate equivalents, while V represents the corresponding value in hue saturation value (HSV) color space. As such, an absolute difference based polyhedron low pass classifier in xyV space can be described according to equation 1a below, for a i×j kernel. Allowing for an amount of band pass, a high pass classifier can also be described as a super structure encompassing the low pass classifier according to equation 1b.

$$Lp[n,m] = \begin{cases} |\Delta x[n,m]| \leq Threshold_{l1} \;\&\& \\ |\Delta y[n,m]| \leq Threshold_{l2} \;\&\& \\ |\Delta V[n,m]| \leq Threshold_{l3} \;\&\& \\ |\Delta x[n,m]| + |\Delta V[n,m]| \leq Threshold_{l4} \;\&\& \\ |\Delta y[n,m]| + |\Delta V[n,m]| \leq Threshold_{l5} \;\&\& \\ |\Delta x[n,m]| + |\Delta y[n,m]| \leq Threshold_{l6} \;\&\& \\ |\Delta x[n,m]| + |\Delta y[n,m]| + |\Delta V[n,m]| \leq Threshold_{l7} \end{cases} \quad (1a)$$

for $0 \leq n \leq i$ and $0 \leq m \leq j$, where Lp[n, m] is set to 1 (i.e., low pass) if all seven conditions are met, or 0 otherwise.

$$Hp[n,m] = \begin{cases} |\Delta x[n,m]| > Threshold_{h1} \;|| \\ |\Delta y[n,m]| > Threshold_{h2} \;|| \\ |\Delta V[n,m]| > Threshold_{h3} \;|| \\ |\Delta x[n,m]| + |\Delta V[n,m]| > Threshold_{h4} \;|| \\ |\Delta y[n,m]| + |\Delta V[n,m]| > Threshold_{h5} \;|| \\ |\Delta x[n,m]| + |\Delta y[n,m]| > Threshold_{h6} \;|| \\ |\Delta x[n,m]| + |\Delta y[n,m]| + |\Delta V[n,m]| > Threshold_{h7} \end{cases} \quad (1b)$$

for $0 \leq n \leq i$ and $0 \leq m \leq j$, where Hp[n, m] is set to 1 (i.e. high pass) if at least one of the seven conditions above are met.

According to the pixel by pixel calculated mask, Lp, the pixel neighborhood hue-saturation is constricted around its center of mass by replacing the current pixel with the average of the xy values taken from the masked neighborhood:

$$I(r,p)_{x,y} = avg(Lp[n+Kh, m+Kv]*I(r+n, p+m))_{x,y} \quad (2)$$

where the average is calculated for $-Kh \leq n \leq +Kh$ and $-Kv \leq m \leq +Kv$, with Kh and Kv being the horizontal and vertical kernel sizes, and r and p the current image coordinates neglecting the required image border extension.

Edge information 306 is provided to the edge based adaptive filter module 302. To achieve this, a scalar value is used to represent the strength of a pixel considered to be on an edge, based on the constructed Hp mask and a Gaussian kernel, G, as shown in equation 3.

$$E_{edge}(r, p) = \sum_{n,m=-Kh,-Kv}^{+Kh,+Kv} Hp[n + Kh, m + kv] * K_{sharp} * G[n + Kh, m + Kv] \quad (3)$$

where $K_{sharp}$ represents an amplitude scalar, with Kh and Kv being the horizontal and vertical kernel sizes, and r and p the current image coordinates neglecting the required image border extension.

If Kh and Kv are greater than three, an additional condition can be imposed on the edge strength calculation, such that single blemish pixels can be prevented that have been missed by previous processing from being classified as edges, which effectively reduces such artifacts in the form of:

$$E_{edge}(r,p)=0 \quad (4)$$

if $$\sum_{n,m=-Kh,-Kv}^{+Kh,+Kv} Hp[n + Kh, m + Kv] = 1$$

when n+Kh>1, m+Kv>1 and n<+Kh respectively m<+Kv.

With regard to the edge based adaptive filter module 302, a factor to consider in image de-noising algorithm via wavelet coefficient shrinkage is threshold selection. The shrinkage problem consists of defining a coefficient thresholding transformation $T(.,\lambda)$ such that the mean square error, MSE=E$[\|X-\hat{X}\|^2]$, between the input X and output $\hat{X}$, is minimized.

Two threshold transformation operators, hard and soft operators, $T_h(.,\lambda)$ and $T_s(.,\lambda)$, respectively, can be used as defined below.

$$T_h(y, \lambda) = \begin{cases} y, & \text{if } |y| \geq \lambda \\ 0, & \text{otherwise} \end{cases}$$

$$T_s(y, \lambda) = \begin{cases} y - \lambda, & \text{if } |y| \geq \lambda \\ y + \lambda, & \text{if } |y| \leq -\lambda \\ 0, & \text{otherwise} \end{cases}$$

Within the context of minimizing the MSE, the threshold value $\lambda$, can be specified as the product of the noise standard deviation, $\sigma_n$, or an estimate of it, $\hat{\sigma}_n$, and a constant C that is optimized with respect to the underlying image class as described in the following equation.

$$T(y,\lambda)=T(y,C\hat{\sigma}_n)$$

The edge based adaptive filter module 302 uses spatial correlation, at the same scale, between the low frequency and high frequency sub-bands to determine a threshold adaptation parameter. In addition, the edge based adaptive filter module 302 utilizes an estimate of the intra-scale local variance within a coefficient neighborhood to supplement the threshold parameter adaptation.

The noise variance, $\hat{\sigma}_n^2$, can be estimated using a median estimator using the equation shown below.

$$\hat{\sigma}_n^2 = \text{median}(|X_{HH}(r,p)|)/0.6745$$

where $X_{HH}(r,p)$ are the wavelet decomposition coefficients in the HH band in the first decomposition stage.

Furthermore to obtain an estimate of the local variance for a coefficient X(m,n), a weighted local variance is calculated, as shown in equation 5, in an n×n context neighborhood, N, when the conditions imposed by equation 1a are met. For the set of weights, w, a two dimensional Gaussian can be sued. In some embodiments, the noise variance is subtracted because X(m,n) is a noisy observation and noise is independent of the signal.

$$\sigma_l[m, n]^2 = \frac{\sum_{i,j \in N} w_{i,j}(X[i, j]^2 - \hat{\sigma}_n^2)}{\sum_{i,j \in N} w_{i,j}} \quad (5)$$

The C value can be calculated on a coefficient by coefficient basis using the following equation:

$$C[m,n]=\sigma_l Wv(E_{edge}) \quad (6)$$

where $Wv(E_{edge})$ is an exponential decay function used to weigh the influence of the estimated local variance.

As such, the disclosed methodology allows for a greater influence of the estimated local variance in flat areas, and hence a larger threshold. Conversely, in textured or edge areas where the local variance is larger, the exponential decay function of $E_{edge}$, reduces the influence of the local variance and insures a smaller or near zero threshold.

Figure 4:
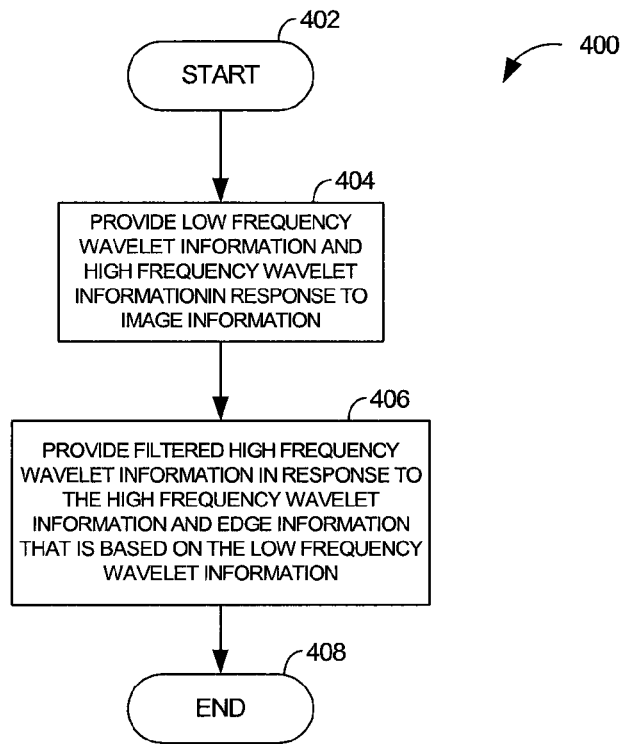
FIG. 4 is an exemplary flowchart depicting operations they can be performed by the adaptive filtering module.

Referring now to FIG. 4, an exemplary operations that can be performed by the low-frequency edge-based adaptive filtering module 202 are generally identified a 400. The process starts at 402. At 404 the wavelet transform module 200 provides the low-frequency wavelet information 226, 228 (e.g., LL) and the high-frequency wavelet information 222, 224 (e.g., LH, HL, HH) in response to the image information 126. At 406, the edge based adaptive filter module 302 provides the filtered high-frequency wavelet information 201, 203 in response to the high-frequency wavelet information 222, 224 (e.g., LH, HL, HH) and the edge information 306 that is based on the low-frequency wavelet information 226, 228 (e.g., LL). The process ends at 408.

As noted above, among other advantages, the filter and method reduce chrominance noise associated with the image information. In addition, the filter and method effectively reduces ringing artifacts (i.e. the Gibbs phenomenon) that are typically encountered when using wavelet image de-noising. Furthermore, the filter and method effectively reduces (or in some cases eliminates) checkerboard reconstruction artifacts that are commonly present in prior art wavelet transform methods. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. An image noise filter, comprising:
   a wavelet transform module that is operative to provide low frequency wavelet information and high frequency wavelet information in response to image information; and
   an edge based adaptive filter module that is operative to provide filtered high frequency wavelet information in response to the high frequency wavelet information and edge information that is based on the low frequency wavelet information.

2. The image noise filter of claim 1 further comprising a low-frequency spatial filter and edge detection module that is operative to provide the edge information in response to the low frequency wavelet information.

3. The image noise filter of claim 1 wherein the wavelet transform module comprises:
at least one low pass filter module that is operative to provide filtered low frequency image information in response to the image information; and
at least one high pass filter module that is operative to provide filtered high frequency image information in response to the image information, wherein the low frequency wavelet information is based on the filtered low frequency image information and the high frequency wavelet information is based on the filtered high frequency image information.

4. The image noise filter of claim 3 wherein wavelet transform module comprises:
at least one first downsampling module that is operative to provide the low frequency wavelet information in response to the filtered low frequency image information; and
at least one second downsampling module that is operative to provide the high frequency wavelet information in response to the filtered high frequency image information.

5. The image noise filter of claim 1 wherein the edge based adaptive filter module comprises at least one adaptive wavelet shrinkage module that is operative to provide filtered high-frequency wavelet information in response to the high-frequency wavelet information and the edge information.

6. The image noise filter of claim 1 further comprising an inverse wavelet transform module that is operative to provide inverse wavelet transform information in response to the filtered low frequency wavelet information and the filtered high frequency wavelet information.

7. The image noise filter of claim 6 wherein the inverse wavelet transform module comprises:
at least one inverse high frequency filter module that is operative to provide inverse high frequency information in response to filtered low frequency wavelet information; and
at least one inverse low frequency filter module that is operative to provide inverse low frequency information in response to filtered high frequency wavelet information.

8. The image noise filter of claim 7 further comprising an averaging module that is operative to provide filtered image information based on the inverse high frequency information and the inverse low frequency information.

9. The image noise filter of claim 1 wherein the wavelet transform module comprises:
at least a second low pass filter module that is operative to provide second filtered low frequency image information in response to the image information; and
at least a second high pass filter module that is operative to provide second filtered high frequency image information in response to the image information, wherein the low frequency wavelet information is based on the second filtered low frequency image information and the high frequency wavelet information is based on the second filtered high frequency image information.

10. A method of filtering image noise, comprising:
providing low frequency wavelet information and high frequency wavelet information in response to image information; and
providing filtered high frequency wavelet information in response to the high frequency wavelet information and edge information that is based on the low frequency wavelet information.

11. The method of claim 10 further comprising providing the edge information in response to the low frequency wavelet information.

12. The method of claim 10 further comprising:
providing filtered low frequency image information in response to the image information; and
providing filtered high frequency image information in response to the image information, wherein the low frequency wavelet information is based on the filtered low frequency image information and the high frequency wavelet information is based on the filtered high frequency image information.

13. The method of claim 12 wherein further comprising:
providing the low frequency wavelet information in response to the filtered low frequency image information; and
providing the high frequency wavelet information in response to the filtered high frequency image information.

14. The method of claim 10 further comprising providing filtered high-frequency wavelet information in response to the high-frequency wavelet information and the edge information.

15. The method of claim 10 further comprising providing inverse wavelet transform information in response to the filtered low frequency wavelet information and the filtered high frequency wavelet information.

16. A device, comprising:
an image sensor that is operative to provide image information;
an image noise filter that comprises:
a wavelet transform module that is operative to provide low frequency wavelet information and high frequency wavelet information in response to image information; and
an edge based adaptive filter module that is operative to provide filtered high frequency wavelet information in response to the high frequency wavelet information and edge information that is based on the low frequency wavelet information; and
a display that is operative to display an image based on the filtered high frequency wavelet information.

17. The device of claim 16 wherein the image noise filter comprises a low-frequency spatial filter and edge detection module that is operative to provide the edge information in response to the low frequency wavelet information.

18. The device of claim 16 wherein the wavelet transform module comprises:
a plurality of low pass filter modules that are each operative to provide filtered low frequency image information in response to the image information; and
a plurality of high pass filter modules that are each operative to provide filtered high frequency image information in response to the image information, wherein the low frequency wavelet information is based on the filtered low frequency image information and the high frequency wavelet information is based on the filtered high frequency image information.

19. The device of claim 16 wherein the edge based adaptive filter module comprises at least one adaptive wavelet shrinkage module that is operative to provide filtered high-frequency wavelet information in response to the high-frequency wavelet information and the edge information.

20. The device of claim 16 further comprising an inverse wavelet transform module that is operative to provide inverse wavelet transform information in response to the filtered low frequency wavelet information and the filtered high frequency wavelet information.

* * * * *